Jan. 9, 1951  M. G. CROSBY  2,537,574
DISTANCE FINDER WITH AUTOMATIC RANGE TRACKING
Original Filed July 24, 1942  2 Sheets-Sheet 1
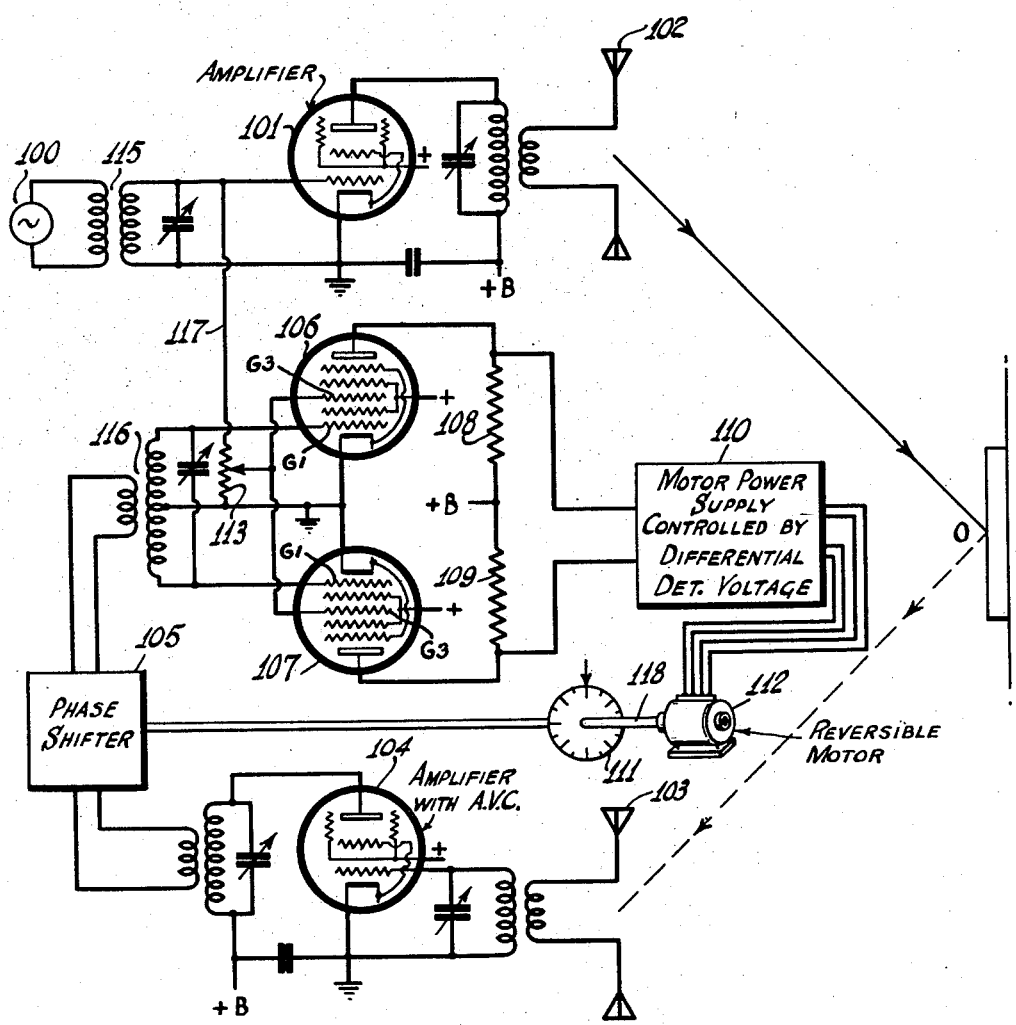
INVENTOR
MURRAY G. CROSBY.
BY
ATTORNEY Jan. 9, 1951 M. G. CROSBY 2,537,574
DISTANCE FINDER WITH AUTOMATIC RANGE TRACKING
Original Filed July 24, 1942 2 Sheets-Sheet 2
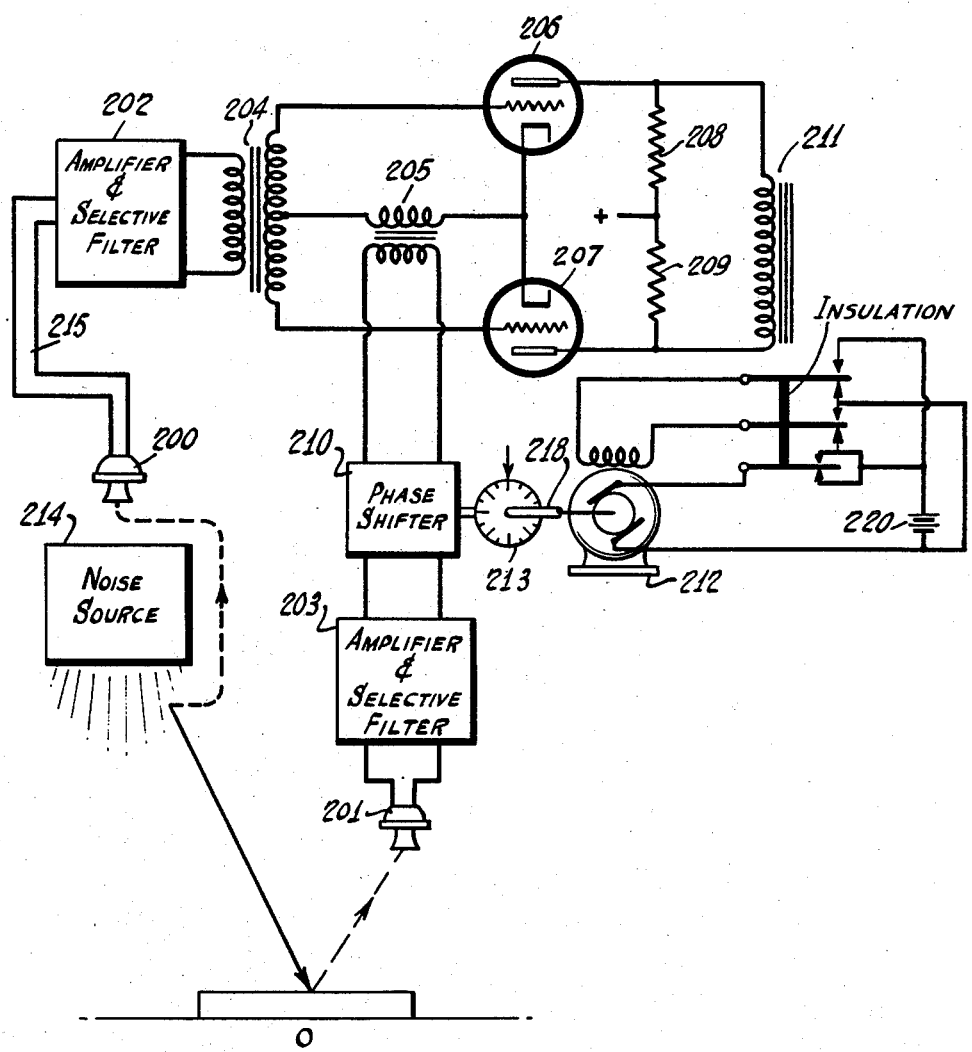
INVENTOR
MURRAY G. CROSBY
BY
ATTORNEY Patented Jan. 9, 1951

2,537,574

UNITED STATES PATENT OFFICE 2,537,574

DISTANCE FINDER WITH AUTOMATIC RANGE TRACKING

Murray G. Crosby, Montclair, N. J., assignor to Radio Corporation of America, a corporation of Delaware Continuation of application Serial No. 452,189, July 24, 1942. This application September 19, 1947, Serial No. 775,029

6 Claims. (Cl. 343—12)

This application is a continuation of my application Serial No. 452,189, filed July 24, 1942, and entitled Distance Finder. The said application Serial No. 452,189, was abandoned on or about October 20, 1947.

This invention relates to distance finders, and especially to a distance determining device in which waves are propagated over direct and indirect paths in which the difference in path length is indicated as a function of the phase shift of the wave traveling over the indirect path.

For an understanding of a known type of distance finder, reference is herein made to my United States Patent 2,268,643, granted January 6, 1942, which describes one form of distance finder suitable for use in many systems. The present invention, however, possesses certain advantages, thus making it a preferred system in many cases.

Briefly stated, the present invention involves transmitting by radiation or otherwise a wave toward the object whose distance is to be determined, and receiving the echo or reflected wave in the vicinity of the transmitting source after it has been reflected from the object or surface. The directly transmitted and the reflected waves are then combined and the combined energy is used to operate an automatic phase control system in such manner as to maintain the two waves in a fixed phase relation by varying a phase shifter in one of the paths. The phase shifter is advanced as the distance between the transmitter and the object increases, and a calibrated dial mounted on the shaft of the phase shifter enables a direct reading of the distance in suitable units.

The following is a more detailed description of the invention in conjunction with a drawing, wherein Figs. 1 and 2 illustrate schematically two different circuit embodiments of the present invention.

The circuit of Fig. 1 shows a specific embodiment in which the distance between an object or surface O and the apparatus to the left of it is to be determined. A constant radio frequency oscillator 100, of the electron discharge device type, supplies wave energy to a vacuum tube amplifier 101 through a transformer 115 and also supplies the same wave energy through lead 117 to a potentiometer 113, from which this energy is applied to the injector grids G3 of a pair of electron discharge devices 106 and 107. Devices 106 and 107 are vacuum tubes arranged to function as phase detectors. The output of the energy amplified in vacuum tube 101 is radiated from a suitable antenna 102. This radiated energy is directed toward the object O and the energy reflected by the object O is picked up on a suitable antenna 103, and amplified by a vacuum tube amplifier 104. Amplifier 104 is illustrative of any single-stage or multi-stage amplifier device, preferably provided with an automatic volume control arrangement. The amplifier 104 feeds the reflected energy to a phase shifter 105, from which the energy is supplied to the control grids G1 of the phase detectors 106, 107 by way of a push-pull transformer 116. It is preferred that the phase shifter be of the type described in my United States Patent 2,247,941, granted July 1, 1941.

Tubes 106 and 107 are, in effect, multi-grid detectors which act as phase detectors to detect the difference in phase between the energy received directly from source 100 over lead 117, and the energy radiated to and reflected from the object O. It should be noted that the energy supplied to the control grids G1 of tubes 106 and 107 from the phase shifter 105 are supplied to these control grids out of phase with respect to each other by virtue of the push-pull input transformer 116, whereas the energy supplied to the injector grids G3 of tubes 106, 107 from the potentiometer 113 are supplied to these injector grids in a cophasal relation. Energy proportional to the phase difference between the direct path (i. e., via lead 117) and the reflected path (via object O) appears across resistors 108 and 109 in the output circuit of the phase detectors, and this energy is used to control the motor power supply unit 110, which feeds power to a reversible motor 112. When the energy supplied to the phase detectors 106 and 107 over lead 117 and over input transformer 116 are at a 90° phase relation, the detector currents in the outputs of the two phase detectors 106 and 107 are balanced, and no voltage appears across resistors 108 and 109. In this condition no energy is supplied to apparatus 110. When the phase between the two energies supplied to the phase detectors 106 and 107 deviates from the aforementioned 90° relation, there will be an unbalance in the currents appearing across the resistors 108 and 109, as a result of which voltage appears across resistors 108 and 109, which is utilized in motor control apparatus 110 to supply energy to a two-winding reversible motor 112 to cause it to rotate.

Apparatus 110, in more detail, consists of a pair of amplifiers arranged so that when the control voltage supplied thereto by the phase detectors 106 and 107 goes positive, energy is fed to one of the windings of the reversible motor 112 to cause the motor to rotate in one direction, and when the control voltage goes negative, energy is fed to the other winding of the motor 112 to reverse the direction of rotation. Equipment of the type which may be employed in apparatus 110 is described in my copending application Serial No. 435,624, filed March 21, 1942, now Patent No. 2,380,948, issued August 7, 1945, entitled "Electronic Motor Control," to which reference is made for a more detailed description thereof.

The reversible motor 112 has a shaft 118 which drives the phase shifter 105 in such direction as to restore the phase of the reflected energy applied to input transformer 116 to the 90° relation relative to the directly applied energy from lead 117, in which condition no voltage will appear across the resistors 108 and 109. A dial 111 is shown mounted on the shaft 118, this dial being calibrated in distance units so that the operator is able to read directly from the dial the distance corresponding to the extent of rotation of the shaft necessary to restore the 90° phase relation condition between the energies applied over the two different paths to the phase detectors. The readings on the dial give the distance of the object from the distance finder apparatus. It will thus be seen that when the phase of the direct wave and the phase of the reflected wave as applied to the phase detectors 106 and 107 is at 90°, no voltage will appear across resistors 108 and 109, and the reversible motor 112 will be stationary. When, however, the phase between the direct wave and the reflected wave as applied to the phase detectors deviates from the 90° relation, a voltage will appear across resistors 108 and 109 and cause one of the amplifiers in 110 to supply energy to one of the windings of the reversible motor to cause this motor to rotate and drive the shaft of the phase shifter in such direction as to restore the 90° relation, in which position no voltage will again appear at the output of the detectors 106 and 107. By this process, the phase relation between the direct and reflected waves as they are fed to the detectors is maintained in fixed relation, and changes occurring due to variation of the distance between the antennas 102, 103 and the object O are compensated for by the rotation of the shaft of the phase shifter 105.

An illustration of one particular application of the invention to the measurement of the height of an aircraft from the ground will now be given: Let us assume that the distance finder apparatus of Fig. 1 is mounted on an airplane, and that this airplane is located on the ground, and that the ground corresponds to the object O. Under this condition, there will be no phase lag due to the reflected wave, and the phase shifter 105 will automatically rotate to the 90° position to form a balance of the detector anode currents. No voltage will therefore appear across resistors 108 and 109 at this time. This 90° position should in this particular illustration be calibrated at zero altitude on the dial 111 of the phase shifter. When the airplane leaves the ground, there will be a certain altitude between the plane and the ground, for which reason there will now be a phase lag in the reflected wave and the phase shifter will automatically advance to compensate for this phase lag. This advance in phase shift caused by a rotation of the shaft 118 is calibrated in distance units on the dial 111. Inasmuch as the automatic phase control will automatically follow the phase lag introduced by the reflected wave, the dial 111 will give a constant indication of the altitude. The phase shifter 105 need be capable of giving no more than 360° shift or, if desired, a shift longer than 360°. If the phase shifter has a shift of 360°, it should be provided with a revolution counter on the shaft, or a geared-down dial so that an altitude equivalent to a shift greater than 360° (which requires more than one rotation of the shaft 118) will be measurable.

In employing a system of the type shown in Fig. 1, in actual practice, antennas 102 and 103 will be of the unidirectional type, and so oriented or designed that direct radiation between these two antennas will be prevented.

Another embodiment of the invention is shown in Fig. 2 showing a circuit which is designed for audio frequency operation. Instead of an oscillator radiating energy to be reflected back, as shown in Fig. 1, there is employed in Fig. 2 a source of noise 214. This noise source 214 may be the inherent noise of the motor of an airplane if the distance finder apparatus is located on an airplane, or may be the inherent noise of the propellers of a vessel if the distance finder is located on a vessel. The direct wave is applied by means of microphone 200 and leads 215 to an amplifier and selective filter apparatus 202, the output of which feeds the direct wave to the differential vacuum tube phase detectors 206 and 207 by way of a push-pull audio frequency transformer 204. The noise sent out by the source 214 toward the object O, whose distance is to be determined, is reflected from the object and picked up by microphone 201, which feeds the reflected energy via amplifier and selective filter 203 and through phase shifter 210 to the transformer 205 of the differential detectors. Filters 202 and 203 aid in rejecting sounds other than those emanating from noise source 214 and also serve to select a given frequency of operation from the noise source. From the foregoing, it will be seen that the reflected wave energy is supplied to the detectors 206 and 207 in a cophasal relation, while the direct wave is supplied to the detectors 206 and 207 in an out of phase relation.

In practice, microphone 201 would be a unidirectional type so oriented that it would not pick up energy directly from the noise source, thus restricting the energy impinging on this microphone to that reflected from the object. When the direct and reflected waves applied to the phase detectors 206 and 207 are at a 90° phase relation, there will be a balance in the currents in the outputs of the detectors and no voltage will appear across the resistors 208 and 209. When the phase between the two waves applied to the detectors 206 and 207 deviates from the 90° relation, a voltage will appear across resistors 208 and 209 of a sense and magnitude corresponding to the direction of deviation and the extent thereof. A relay 211 has its winding connected across the anode terminals or resistors 208, 209 as shown. This relay is arranged as illustrated to operate and control a direct current motor 212. Motor 212 has its single field and armature energized by battery 220. Relay 211 serves as a reversing relay for the field voltage and as an on-off relay for the armature voltage. The motor is provided with a shaft 218 which serves to rotate the phase shifter 210. Phase shifter 210 is preferably of the type described in my United States Patent 2,247,941. A dial 213 is mounted on the shaft 218 and is suitably calibrated in distance units.

In the operation of the system of Fig. 2, when the phase difference between the direct and reflected waves as applied to the detectors 206 and

207 differs from the 90° relation, a voltage appears across resistors 208 and 209 which will operate relay 211 and start motor 212 in the proper direction to rotate phase shifter 210, to compensate for the phase deviation from the 90° position. The contacts of relay 211 are arranged so that a positive voltage in its coil winding starts the motor 212 with one polarity on its field, and a negative voltage across its coil winding starts the motor 212 in the opposite direction, due to the reversal of the terminals of the field of the motor produced by the change in direction of operation of the relay 211. When the phase difference between the direct and reflected waves as applied to the detectors 206 and 207 is 90°, no voltage appears across the resistors 208 and 209, and the relay 211 is unenergized, in which condition the motor 212 will be stationary.

Although the system of Fig. 1 has been described with particular reference to the use of a radio frequency wave, the tuned circuits thereof being tuned to this particular radio frequency, and while the system of Fig. 2 has been described particularly in connection with the use of sound waves, it should be understood that different applications of the invention will require different frequencies. Thus, by varying the frequency and choosing the type of wave desired for a particular application, the number of wavelengths existing in a given distance may be varied to provide the required sensitivity of the indication. Ordinarily, small distances would require a higher frequency than longer distances.

What is claimed is:

1. A distance determining device including a source of unmodulated sine waves of substantially unchanging frequency, a phase detector for comparing the phase of sine waves, said phase detector having an input circuit and an output circuit, a circuit for feeding the input circuit of said detector over one path with unmodulated waves received directly from said source, a wave directive structure for radiating the unmodulated waves produced by said source, a wave directive receiving structure for receiving the waves radiated by said first structure and reflected back from the object whose distance is to be determined, and a circuit coupled to said wave directive receiving structure for feeding the input circuit of said detector over another path with waves of the same frequency as those received on the receiving structure, an adjustable phase shifter in one of said paths, and means for controlling the adjustment of said phase shifter in response to the energy in the output circuit of said phase detector.

2. A distance determining device including a source of unmodulated sine waves of substantially unchanging frequency, a phase detector for comparing the phase of sine waves, a circuit for feeding said detector over one path with unmodulated waves received directly from said source, a wave directive structure for radiating the unmodulated waves produced by said source, a wave directive receiving structure for receiving the waves radiated by said first structure and reflected back from the object whose distance is to be determined, and a circuit coupled to said wave directive receiving structure for feeding said detector over another path with waves of the same frequency as those received on the receiving structure, a phase shifter in one of said paths, a reversible motor having a shaft linked to said phase shifter for adjusting the phase of the energy passing through said shifter, and means coupled to and deriving energy from said phase detector and responsive to currents flowing in said phase detector for controlling the movement of said motor in accordance with the polarity of the voltage available in the output of said detector.

3. A distance determining device including an electron discharge device oscillator producing unmodulated sine waves of substantially unchanging frequency, an antenna for radiating the waves produced by said oscillator, a phase detector for comparing the phase of sine waves, said phase detector having an input circuit and an output circuit, a circuit for directly supplying the input circuit of said detector with unmodulated waves produced by said oscillator, a pick-up device for receiving the unmodulated waves radiated from said antenna and reflected back from the object whose distance is to be determined, a circuit including a phase shifter extending from said pick-up device to the input circuit of said phase detector for supplying said phase detector with unmodulated waves of the same frequency as those received on said pick-up device, rotatable means in the output circuit of said detector for adjusting said phase shifter in response to a voltage appearing in said output circuit, and an indicator operative with movement of said phase shifter.

4. In a distance finder, a source of unmodulated sine waves of substantially unchanging frequency, a phase detector for comparing the phase of sine waves comprising a pair of electron discharge devices, a circuit for supplying a pair of electrodes of said devices in cophasal relation to each other with an unmodulated sine wave voltage from said source, a circuit for supplying a pair of electrodes of said devices in out-of-phase relation to each other with another sine wave voltage representative of an unmodulated sine wave reflected from an object or surface whose distance is to be determined, an adjustable phase shifter in one of said circuits, and means responsive to a voltage developed in said detector for automatically controlling the adjustment of said phase shifter to maintain a desired phase relation between said two voltages.

5. In a distance finder, a source of unmodulated sine waves of substantially unchanging frequency, a phase detector for comparing the phase of sine waves comprising a pair of electron discharged devices, a circuit for supplying a pair of control electrodes of said devices in cophasal relation to each other with an unmodulated sine wave voltage from said source, a circuit for supplying another pair of control electrodes of said devices in out-of-phase relation to each other with another sine wave voltage representative of an unmodulated sine wave reflected from an object or surface whose distance is to be determined, an adjustable phase shifter in one of said circuits, and means responsive to a voltage developed in said detector for controlling the adjustment of said phase shifter to maintain a desired phase relation between said two voltges.

6. In a distance finder, a source of unmodulated sine waves of substantially unchanging frequency, a phase detector for comparing the phase of sine waves, said phase detector comprising a pair of electron discharge devices each having a control electrode and an output electrode, a circuit for supplying said control electrodes of said devices in out-of-phase relation to each other with an unmodulated sine wave voltage from said source, a circuit for supplying the same control electrodes of said devices in cophasal relation to each other with another unmodulated sine wave voltage representative of a wave reflected from an object or surface whose distance is to be determined, an adjustable phase shifter in said last circuit, and means including a motor responsive to a voltage developed across the output electrodes of said detector for controlling the adjustment of said phase shifter to maintain a desired phase relation between said two voltages.

MURRAY G. CROSBY.

REFERENCES CITED

The following references are of record in the file of this patent:

UNITED STATES PATENTS

| Number | Name | Date |
|---|---|---|
| 1,756,462 | Jenkins | Apr. 29, 1930 |
| 2,198,113 | Holmes | Apr. 23, 1940 |
| 2,248,727 | Strobel | July 8, 1941 |
| 2,253,975 | Guanella | Aug. 26, 1941 |
| 2,345,933 | Green et al. | Apr. 4, 1944 |
| 2,403,975 | Graham | July 16, 1946 |
| 2,414,469 | Isbister | Jan. 21, 1947 |
| 2,422,074 | Bond | June 10, 1947 |
| 2,480,829 | Barrow et al. | Sept. 6, 1949 |